United States Patent
Samuelsson et al.

(10) Patent No.: US 10,144,302 B2
(45) Date of Patent: Dec. 4, 2018

(54) TWISTED WIRE FOR POWER CHARGING

(71) Applicant: QUALCOMM Incorporated, San Diego, CA (US)

(72) Inventors: Johan Gabriel Samuelsson, Aying (DE); Simon Islinger, Munich (DE); Michael Werner, Markt Schwaben (DE)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 15/275,094

(22) Filed: Sep. 23, 2016

(65) Prior Publication Data

US 2018/0086211 A1 Mar. 29, 2018

(51) Int. Cl.
| | |
|---|---|
| *B60L 11/18* | (2006.01) |
| *H02J 50/10* | (2016.01) |
| *H02J 7/02* | (2016.01) |
| *H01F 27/28* | (2006.01) |
| *H01F 38/14* | (2006.01) |

(52) U.S. Cl.
CPC ........ *B60L 11/182* (2013.01); *H01F 27/2871* (2013.01); *H01F 38/14* (2013.01); *H02J 7/025* (2013.01); *H02J 50/10* (2016.02); *B60L 2230/10* (2013.01)

(58) Field of Classification Search
CPC ......... B60L 11/182; H02J 50/10; H02J 7/025; H01F 27/2871; H01F 38/14
USPC .......................................................... 320/108
See application file for complete search history.

(56) References Cited

U.S. PATENT DOCUMENTS

| | | | |
|---|---|---|---|
| 7,973,635 B2 | 7/2011 | Baarman et al. | |
| 2002/0117320 A1 | 8/2002 | Hyogo | |
| 2013/0270921 A1* | 10/2013 | Boys | H01F 38/14 |
| | | | 307/104 |
| 2013/0307469 A1 | 11/2013 | Kuroda et al. | |

(Continued)

FOREIGN PATENT DOCUMENTS

| | | |
|---|---|---|
| EP | 1930918 A2 | 6/2008 |
| JP | 2005085560 A | 3/2005 |
| WO | WO-2013046533 A1 | 4/2013 |

(Continued)

OTHER PUBLICATIONS

Alatalo M., et al., "Wireless Charging for vehicles—Some Key Elements", IEEE Power Electronics and Applications, 2014 16th European Conference on, Aug. 2014, pp. 1-7.

(Continued)

*Primary Examiner* — Stacy Whitmore
(74) *Attorney, Agent, or Firm* — Knobbe, Martens, Olson & Bear, LLP

(57) ABSTRACT

Systems and methods for a twisted rectangular litz wire for generating or receiving wireless electrical power. The rectangular litz wire may be arranged as a DD coil having first and second co-planar loops. The loops may have a shared single-stacked inner portion and double-stacked outer portions. The litz wire may be twisted between the inner and outer portions, such that a width of the coils at the outer portions is defined by a first longer side of the wires, and a width of the coils at the inner portion is defined by a second shorter side of the wires. This arrangement may reduce a size of the DD coil may reducing a width of the shared inner portion.

16 Claims, 11 Drawing Sheets

(56) References Cited

U.S. PATENT DOCUMENTS

2015/0207332 A1      7/2015  Honda et al.
2015/0332841 A1*   11/2015  Hasegawa ................ H01F 5/00
                                                                307/104

FOREIGN PATENT DOCUMENTS

WO     WO-2014025643 A1     2/2014
WO     WO-2016114893 A1     7/2016

OTHER PUBLICATIONS

International Search Report and Written Opinion—PCT/US2017/047331—ISA/EPO—dated Nov. 21, 2017.

* cited by examiner

TWISTED WIRE FOR POWER CHARGING

FIELD

This disclosure relates generally to wireless power transfer, and more specifically to coils and pads used for wireless power transfer.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors can sometimes be inconvenient or cumbersome and have other drawbacks. Wireless charging systems that are capable of transferring power in free space (e.g., via a wireless field) to be used to charge electric vehicles can overcome some of the deficiencies of wired charging solutions.

In some designs, an electric vehicle can be configured to receive charge through a wireless power supply. Due to limited space on electric vehicles and other chargeable devices, it is often desirable for a charging pad for receiving wireless power to be compact while being able to receive a high amount of power. As such, wireless charging systems having reduced size while maintaining power throughput are needed.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

In some embodiments, a device for generating or receiving wireless power via a magnetic field at a level sufficient to power or charge an electronic device is provided. The device may comprise a first coil configured to generate or receive wireless power via a magnetic field. The first coil may comprise one or more first windings each having a substantially rectangular cross-section with at least a first surface having a first width and a second surface orthogonal to the first surface having a second width greater than the first width. Each of the first windings may comprise a first segment having the first surface oriented horizontally and the second surface in the first segment oriented vertically relative to a surface of a housing structure. Each of the first windings may further comprise a second segment having the first surface in the second segment oriented vertically and the second surface in the second segment oriented horizontally relative to the surface of the housing structure. The second segment is connected to the first segment via a twisted segment.

In some embodiments, an apparatus for wirelessly transferring power is provided. The apparatus may comprise a first coil configured to wirelessly receive power via a magnetic field, the first coil comprising one or more litz wires each having a rectangular cross section with a first longer side and a second shorter side. The apparatus may further comprise a second coil configured to wirelessly receive power via a magnetic field, the second coil comprising one or more of the litz wires and the positioned to be at least partially coplanar with the first loop. Each of the first and second loops may comprise a plurality of litz wires, each having a rectangular cross section with a first longer side and a second shorter side. The one or more litz wires of the first and second coils may be twisted such that a width of the first and second coils at a first portion is defined by the first longer side of the one or more litz wires, and a width of the coils at a second portion is defined by the second shorter side of the one or more litz wires.

In some embodiments, a method of winding coils of an charging device for generating or receiving wireless power via a magnetic field at a level sufficient to power or charge an electronic device is provided. The method may comprise positioning a first coil comprising one or more rectangular litz wires having a length greater than a width such that the length is parallel with a plane of the charging device in a first region of the charging device and perpendicular with the plane in a second region of the charging device.

In some embodiments, a device for generating or receiving wireless power via a magnetic field at a level sufficient to power or charge an electronic device is provided. The device comprises a first segment of a first coil having a substantially rectangular cross-section with at least a first surface having a first width and a second surface orthogonal to the first surface having a second width greater than the first width. The first surface in the first segment is oriented horizontally and the second surface in the first segment is oriented vertically relative to a surface of a housing structure. The device further comprises a second segment of the first coil connected to the first segment via a twisted segment. The second segment shares the first surface and the second surface and has a substantially rectangular cross-section. The first surface in the second segment is oriented vertically and the second surface in the second segment is oriented horizontally. The first segment and the second segment are configured to generate or receive wireless power via the magnetic field at a level sufficient to power or charge an electronic device.

In some embodiments, an apparatus for wirelessly transferring power is provided. The apparatus comprises a first loop enclosing a first area and configured to wirelessly receive power via a magnetic field. The apparatus comprises a second loop enclosing a second area and configured to wirelessly receive power via a magnetic field. The first loop is positioned to be at least partially coplanar with the second loop, the first area at a different location than the second area. Each of the first and second loops comprises a plurality of litz wires. Each litz wire has a rectangular cross section with a first longer side and a second shorter side. Each of the first and second loops comprises a double-stacked outer portion and a single-stacked inner portion. The litz wires are twisted such that a width of the coils at the outer portion is defined by the first longer side of the wires, and a width of the coils at the inner portion is defined by the second shorter side of the wires.

DETAILED DESCRIPTION

The detailed description set forth below in connection with the appended drawings is intended as a description of exemplary implementations and is not intended to represent the only implementations in which the present disclosure may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
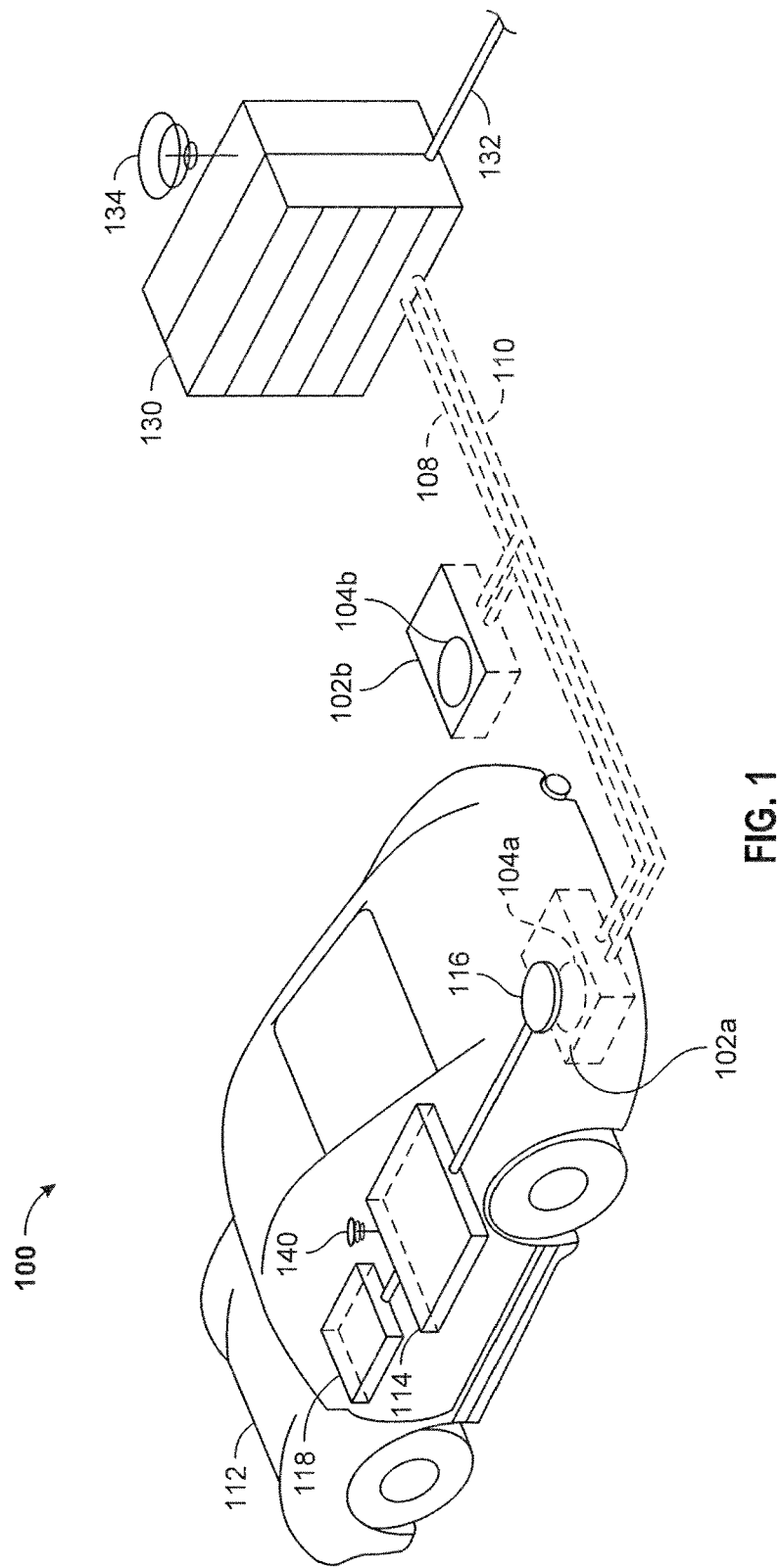
FIG. 1 illustrates a wireless power transfer system for charging an electric vehicle, in accordance with some implementations.

FIG. 1 is a diagram of an exemplary wireless power transfer system 100 for charging an electric vehicle, in accordance with some exemplary implementations. The wireless power transfer system 100 enables charging of an electric vehicle 112 while the electric vehicle 112 is parked so as to efficiently couple with a base wireless charging system 102a. Spaces for two electric vehicles are illustrated in a parking area to be parked over corresponding base wireless charging systems 102a and 102b. In some implementations, a local distribution center 130 may be connected to a power backbone 132 and configured to provide an alternating current (AC) or a direct current (DC) supply through a power link 110 to the base wireless charging systems 102a and 102b. Each of the base wireless charging systems 102a and 102b also includes a base coupler 104a and 104b, respectively, for wirelessly transferring power. In some other implementations (not shown in FIG. 1), base couplers 104a or 104b may be stand-alone physical units and are not part of the base wireless charging system 102a or 102b.

The electric vehicle 112 may include a battery unit 118, an electric vehicle coupler 116, and an electric vehicle wireless charging unit 114. The electric vehicle wireless charging unit 114 and the electric vehicle coupler 116 constitute the electric vehicle wireless charging system. In some diagrams shown herein, the electric vehicle wireless charging unit 114 is also referred to as the vehicle charging unit (VCU). The electric vehicle coupler 116 may interact with the base coupler 104a for example, via a region of the electromagnetic field generated by the base coupler 104a.

In some exemplary implementations, the electric vehicle coupler 116 may receive power when the electric vehicle coupler 116 is located in an electromagnetic field produced by the base coupler 104a. The field may correspond to a region where energy output by the base coupler 104a may be captured by the electric vehicle coupler 116. For example, the energy output by the base coupler 104a may be at a level sufficient to charge or power the electric vehicle 112. In some cases, the field may correspond to a "near-field" of the base coupler 104a. The near-field may correspond to a region in which there are strong reactive fields resulting from the currents and charges in the base coupler 104a that do not radiate power away from the base coupler 104a. In some cases the near-field may correspond to a region that is within about ½π of a wavelength of the a frequency of the electromagnetic field produced by the base coupler 104a distant from the base coupler 104a, as will be further described below.

Local distribution center 130 may be configured to communicate with external sources (e.g., a power grid) via a communication backhaul 134, and with the base wireless charging system 102a via a communication link 108.

In some implementations the electric vehicle coupler 116 may be aligned with the base coupler 104a and, therefore, disposed within a near-field region simply by the electric vehicle operator positioning the electric vehicle 112 such that the electric vehicle coupler 116 is sufficiently aligned relative to the base coupler 104a. Alignment may be considered sufficient when an alignment error has fallen below a tolerable value. In other implementations, the operator may be given visual and/or auditory feedback to determine when the electric vehicle 112 is properly placed within a tolerance area for wireless power transfer. In yet other implementations, the electric vehicle 112 may be positioned by an autopilot system, which may move the electric vehicle 112 until the sufficient alignment is achieved. This may be performed automatically and autonomously by the electric vehicle 112 with or without driver intervention. This may be possible for an electric vehicle 112 that is equipped with a servo steering, radar sensors (e.g., ultrasonic sensors), and intelligence for safely maneuvering and adjusting the electric vehicle. In still other implementations, the electric vehicle 112 and/or the base wireless charging system 102a may have functionality for mechanically displacing and moving the couplers 116 and 104a, respectively, relative to each other to more accurately orient or align them and develop sufficient and/or otherwise more efficient coupling there between.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless power transfer system 100. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 112 may be used as distributed storage devices to stabilize a power grid, a convenient docking-to-grid solution may help to increase availability of vehicles for vehicle-to-grid (V2G) operation.

The wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that either the base wireless charging system 102a can transmit power to the electric vehicle 112 or the electric vehicle 112 can transmit power to the base wireless charging system 102a. This capability may be useful to stabilize the power distribution grid by allowing electric vehicles 112 to contribute power to the overall distribution system in times of energy shortfall caused by over demand or shortfall in renewable energy production (e.g., wind or solar).

Figure 2:
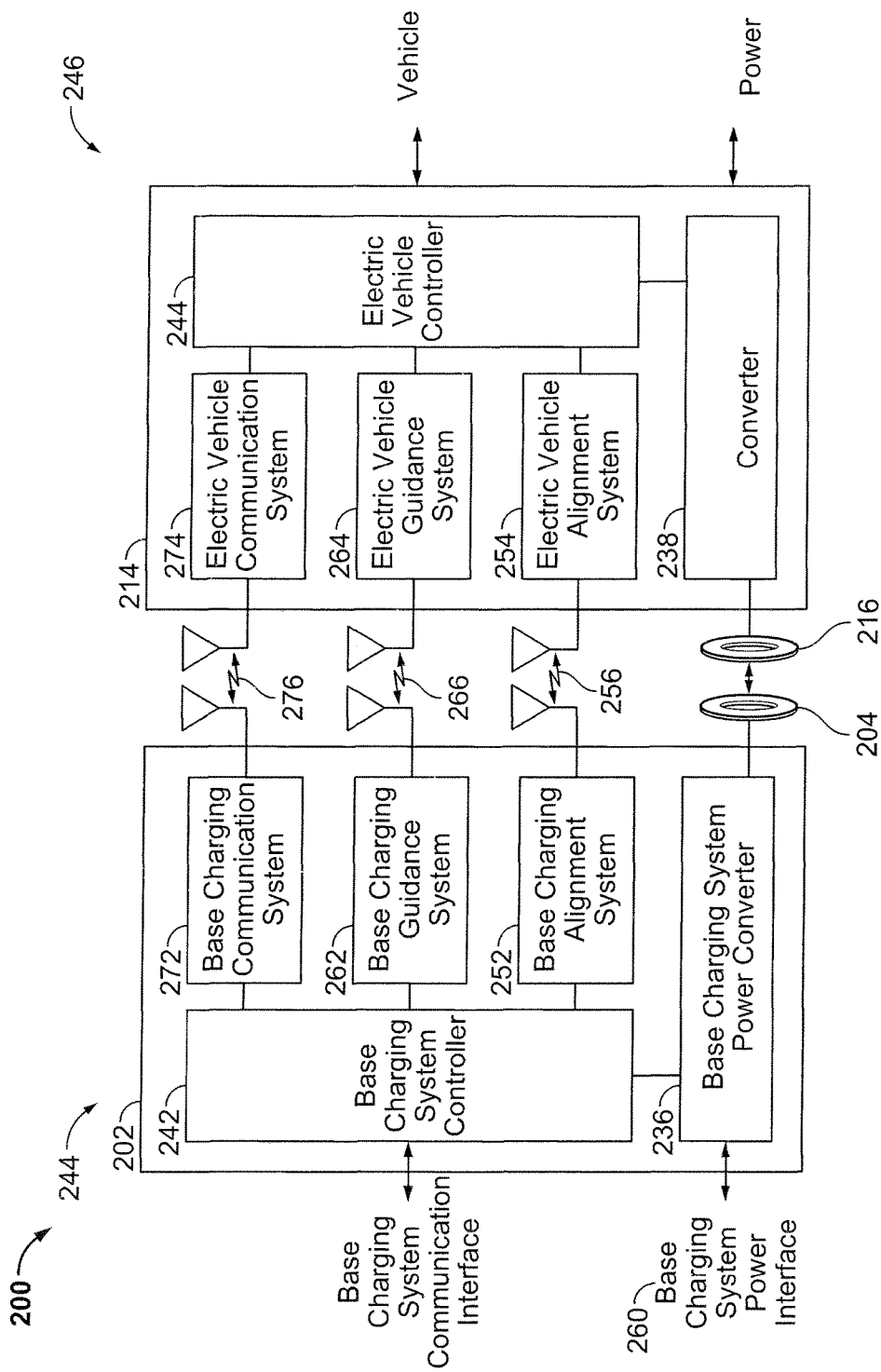
FIG. 2 is functional block diagram showing exemplary core and ancillary components of the wireless power transfer system of FIG. 1.

FIG. 2 is functional block diagram showing exemplary components of the wireless power transfer system 100 of FIG. 1. The wireless power transfer system 200 illustrates a communication link 276, a guidance link 266, and alignment systems 252, 254 for the base system induction coil 204 and electric vehicle induction coil 216. Assuming energy flow towards the electric vehicle 112, in FIG. 2 a base charging system power interface 260 can be configured to provide power to a charging system power converter 236 from a power source, such as an AC or DC power supply 132. The base charging system power converter 236 can receive AC or DC power from the base charging system power interface 260 to excite the base system induction coil 204 at or near its resonant frequency. The electric vehicle induction coil 216, when in the near field coupling-mode region, can receive energy from the near field coupling mode region to oscillate at or near the resonant frequency. The electric vehicle power converter 238 converts the oscillating signal from the electric vehicle induction coil 216 to a power signal suitable for charging a battery via the electric vehicle power interface.

The base wireless charging system 202 includes a base charging system controller 242 and the electric vehicle charging system 214 includes an electric vehicle controller 244. The base charging system controller 242 can include a base charging system communication interface to other systems (not shown) such as, for example, a computer, a wireless device, and a power distribution center, or a smart power grid. The electric vehicle controller 244 can include an electric vehicle communication interface to other systems (not shown) such as, for example, an on-board computer on the vehicle, other battery charging controller, other electronic systems within the vehicles, and remote electronic systems.

The base charging system controller 242 and electric vehicle controller 244 can include subsystems or modules for specific application with separate communication channels. These communications channels can be separate physical channels or separate logical channels. As non-limiting examples, a base charging alignment system 252 can communicate with an electric vehicle alignment system 254 through a communication link 256 to provide a feedback mechanism for more closely aligning the base system induction coil 204 and electric vehicle induction coil 216, either autonomously or with operator assistance. Similarly, a base charging guidance system 262 can communicate with an electric vehicle guidance system 264 through a guidance link 266 to provide a feedback mechanism to guide an operator in aligning the base system induction coil 204 and electric vehicle induction coil 216. In addition, there can be separate general-purpose communication links (e.g., channels), such as communication link 276, supported by base charging communication system 272 and electric vehicle communication system 274 for communicating other information between the base wireless power charging system 202 and the electric vehicle charging system 214. This information can include information about electric vehicle characteristics, battery characteristics, charging status, and power capabilities of both the base wireless power charging system 202 and the electric vehicle charging system 214, as well as maintenance and diagnostic data for the electric vehicle 112. These communication links or channels can be separate physical communication channels such as, for example, Dedicated Short-Range Communications (DSRC), IEEE 802.11x (e.g., Wi-Fi), Bluetooth, zigbee, cellular, infrared, etc.

Electric vehicle controller 244 can also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that can provide higher parking accuracy, thus reducing the need for mechanical horizontal induction coil alignment in any of the base wireless charging system 102a and the electric vehicle charging system 114. Further, electric vehicle controller 244 can be configured to communicate with electronics of the electric vehicle 112. For example, electric vehicle controller 244 can be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 200 can include detection and sensor systems. For example, the wireless power transfer system 200 can include sensors for use with systems to properly guide the driver or the vehicle to the charging spot, sensors to mutually align the induction coils with the required separation/coupling, sensors to detect objects that can obstruct the electric vehicle induction coil 216 from moving to a particular height and/or position to achieve coupling, and safety sensors for use with systems to perform a reliable, damage free, and safe operation of the system. For example, a safety sensor can include a sensor for detection of presence of animals or children approaching the wireless power induction coils 104a, 116 beyond a safety radius, detection of metal objects near the base system induction coil 204 that can be heated up (induction heating), detection of hazardous events such as incandescent objects on the base system induction coil 204, and temperature monitoring of the base wireless power charging system 202 and electric vehicle charging system 214 components.

The wireless power transfer system 200 can also support plug-in charging via a wired connection. A wired charge port can integrate the outputs of the two different chargers prior to transferring power to or from the electric vehicle 112. Switching circuits can provide the functionality as needed to support both wireless charging and charging via a wired charge port.

To communicate between a base wireless charging system 202 and an electric vehicle charging system 214, the wireless power transfer system 200 can use both in-band signaling and an RF data modem (e.g., Ethernet over radio in an unlicensed band). The out-of-band communication can provide sufficient bandwidth for the allocation of value-added services to the vehicle user/owner. A low depth amplitude or phase modulation of the wireless power carrier can serve as an in-band signaling system with minimal interference.

In addition, some communication can be performed via the wireless power link without using specific communications antennas. For example, the wireless power induction coils 204 and 216 can also be configured to act as wireless communication transmitters. Thus, some embodiments of the base wireless power charging system 202 can include a controller (not shown) for enabling keying type protocol on the wireless power path. By keying the transmit power level (amplitude shift keying) at predefined intervals with a predefined protocol, the receiver can detect a serial communication from the transmitter. The base charging system power converter 236 can include a load sensing circuit (not shown) for detecting the presence or absence of active electric vehicle receivers in the vicinity of the near field generated by the base system induction coil 204. By way of example, a load sensing circuit monitors the current flowing to the power amplifier, which is affected by the presence or absence of active receivers in the vicinity of the near field generated by base system induction coil 104a. Detection of changes to the loading on the power amplifier can be monitored by the base charging system controller 242 for use in determining whether to enable the oscillator for transmitting energy, to communicate with an active receiver, or a combination thereof.

The wireless power transfer system 100 described can be used with a variety of electric vehicles 102 including rechargeable or replaceable batteries.

In some embodiments, the electric vehicle coupler 116 and/or base system induction coil 204 may be referred to as a "vehicle pad," while the base coupler 104a and/or electric vehicle induction coil 216 may be referred to as a "base pad."

Vehicle/Base Pad Using Double-D (DD) Coil

Figure 3A:
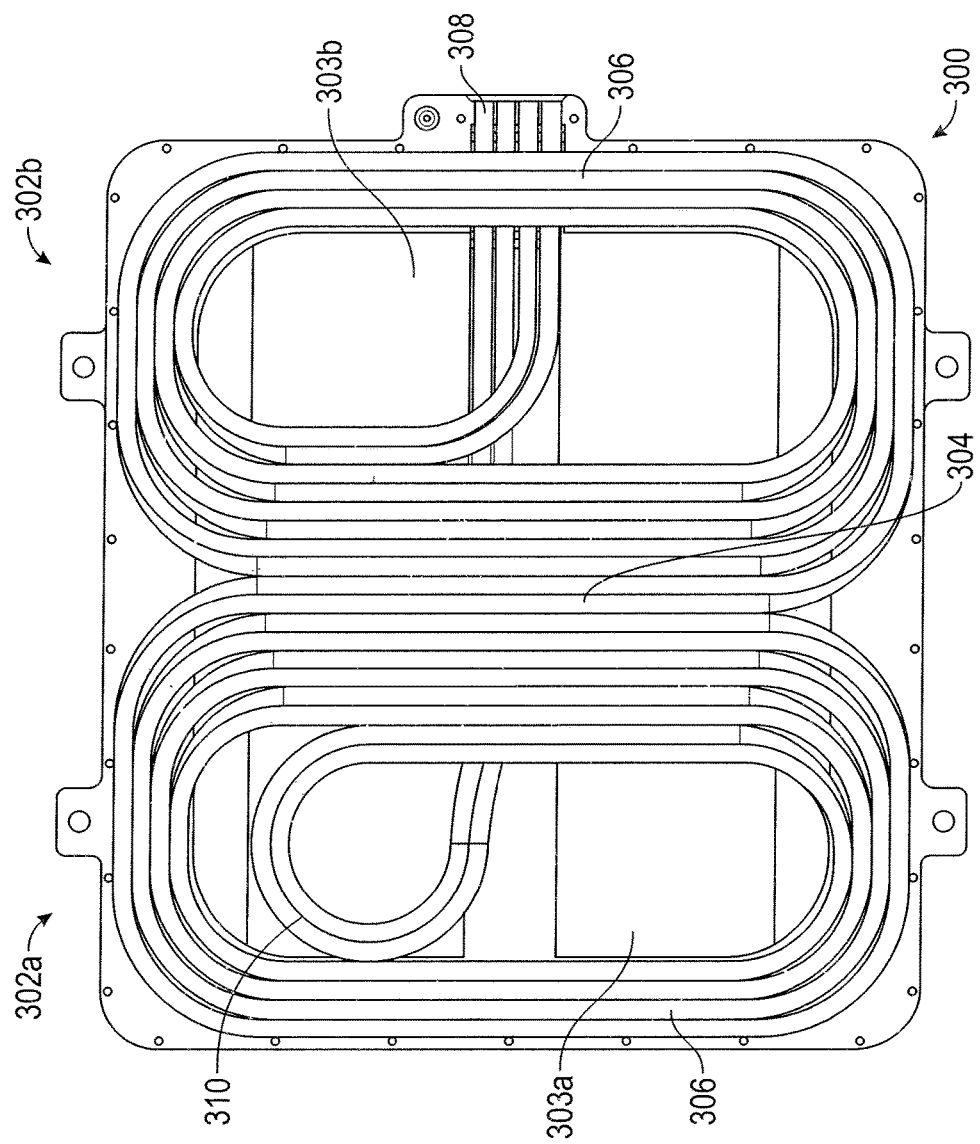
FIGS. 3A and 3B illustrates a top-down view and perspective view of a DD coil.
Figure 3B:
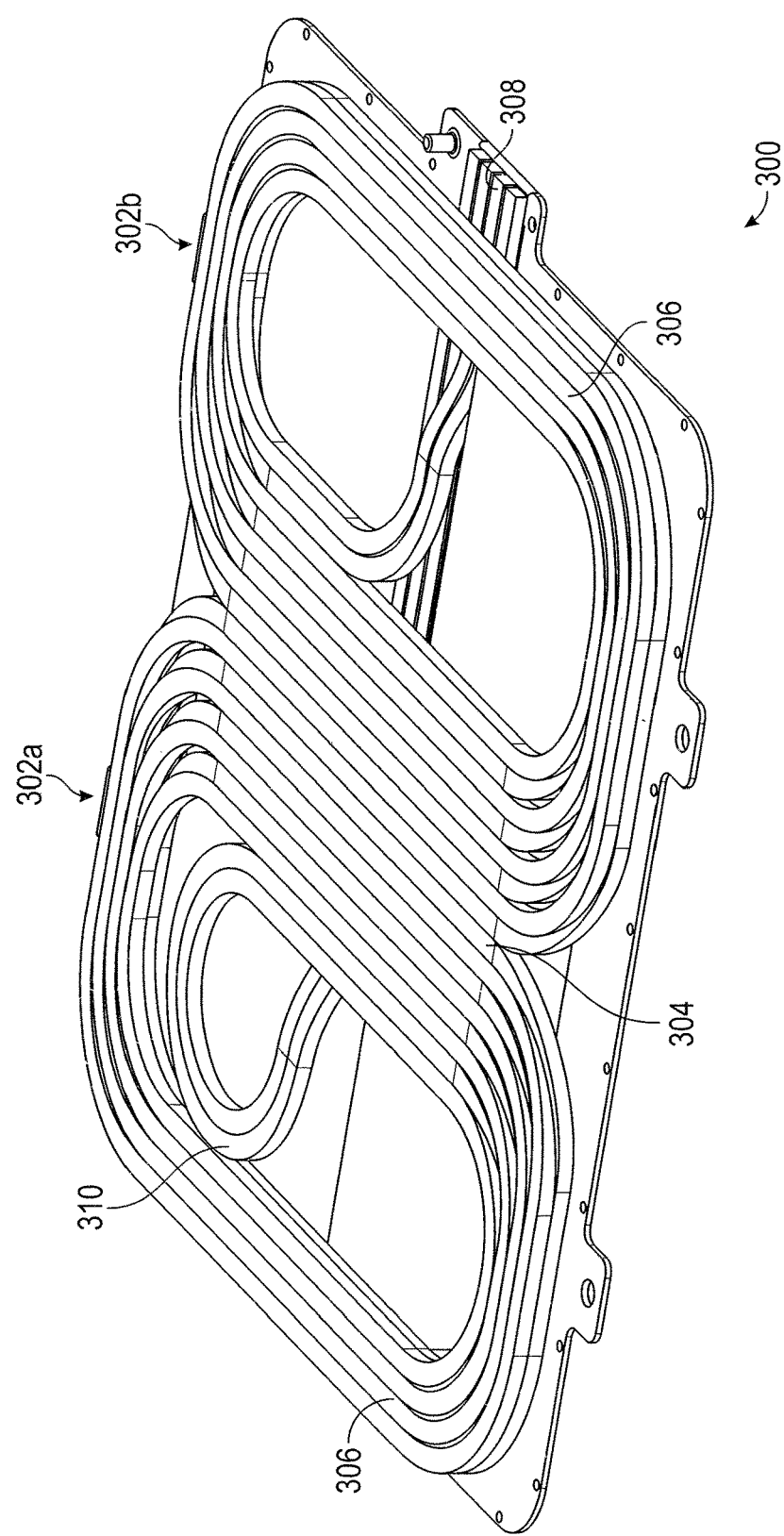

In some embodiments, at least one of the vehicle pad or base pad may be implemented as a double-D (DD) coil. FIGS. 3A and 3B illustrate a DD coil 300 in accordance with some embodiments. FIG. 3A illustrates a top-down view, while FIG. 3B illustrates a perspective view. The DD coil 300 may correspond to the electric vehicle coupler 116 or base coupler 104a as illustrated in FIG. 1, or the base system induction coil 204 or electric vehicle indication coil 216 as illustrated in FIG. 2. The DD coil 300 may comprise two coils, a first coil 302a and a second coil 302b, each coil having a shape conforming to or similar to a "D" and defining a respective window areas 303a and 303b. For ease of explanation, the embodiments described below will primarily refer to the DD coil 300 as being implemented as a vehicle pad (e.g., configured to receive wireless power from a base pad), although it is understood that in other embodiments, the DD coil 300 may be implemented as a base pad.

In some embodiments, the first and second coils 302a and 302b are substantially coplanar and positioned in a substantially adjacent fashion. The portions of the coils 302a and 302b adjacent to each other form a center portion 304, while the non-adjacent portions of the coils make up the side portions 306.

In some embodiments, the coils 302a and 302b are wound such that the currents flowing through each of the coils 302a and 302b flow in opposite directions (e.g., the current may flow clockwise through coil 302a, and counter-clockwise through coil 302b). Each of the coils 302a and 302b may have a "pole" within the window areas 303a and 303b, formed by each of the coils 302a and 302b along which flux (e.g., generated by a base pad) may flow. For example, flux (e.g., from a wireless field generated by a base pad) may travel vertically up the pole of the coil 302a (through window area 303a), travel horizontally across the center portion 304, before traveling vertically down the pole of the coil 302b (through window area 303b). Given that the coils 302a and 302b are wound such that their current flows are in opposite directions, the currents through center portion 304 will flow in the same direction. As such, the flux-generated currents in each of the coils 302a and 302b sum instead of cancel (e.g., when the coils 302a and 302b are operating as receiving coils). The generated currents may be used to transfer power to a battery or other chargeable device.

In addition to coils 302a and 302b, the DD coil 300 further comprises output wires 308, allowing the current generated in coils 302a and 302b to flow out of the DD coil, allowing power to be transferred to a battery or other chargeable device.

In some embodiments, the DD coil 300 may be made of stranded litz wire. In some embodiments, litz wire may be provided for use in high frequency alternating currents. In some embodiments, litz wire may include an insulating sheath including many thin wire strands, each of which are individually insulated and then twisted or woven together. The multiple strands negate the skin effect which can occur at high frequency by having many cores through which the current can travel.

In some embodiments, the litz wire may comprise strands having a rectangular cross-section. A rectangular cross-section typically allows for the litz wire to have a larger cross section per turn in the coil, in comparison to a round cross-section, allowing for potentially a greater amount of current to flow through the DD coil. This may be desirable in applications requiring high power capacity (e.g., 11-20 kW). In some embodiments, a cross-section of a rectangular litz wire will comprise a longer edge (hereinafter also referred to as the horizontal edge) and a shorter edge (hereinafter also referred to as the vertical edge).

In some embodiments, a ferrite layer (not shown) comprising a ferromagnetic material may be used to affect a distribution of a magnetic field through the DD coil 300. The ferrite layer may be located in front of or underneath the DD coil 300. In some embodiments, the ferrite layer may be formed on a plane substantially parallel to the plane defined by the DD coil 300. In some embodiments, due to a larger portion of magnetic flux passing through the center portion 304 of DD coil 300 in comparison to the side portions 306 during operation, a larger amount of ferrite may be located near center portion 304 in comparison to side portions 306 (e.g., a thickness of the ferrite layer is greater near center portion 304 in comparison to side portion 306).

Double-Stacked DD Coil

In some embodiments, the side portions 306 of the DD coil 300 may be double-stacked in order to reduce the size of the DD coil while maintaining a number of turns in each coil 302a and 302b. For example, as illustrated in FIGS. 3A and 3B, the side portions 306 of DD coil 300 contain 8 turns of rectangular litz wire, arranged in 2 layers (4 turns per layer).

In order to reduce a thickness of the pad, the litz wire may be stacked such that the wider edges of the litz wires are adjacent to each other, and the shorter edges of the litz wire arranged in series, such that the thickness (e.g., indicating a dimension of the coil orthogonal to the plane of the coil, also referred to as a height of the coil) of the base pad at the side portions 306 is based upon twice the thickness of the shorter edge of the litz wire. In some embodiments, due to the need for larger portions of ferrite in the center portion 304 (e.g., due to more magnetic flux is passing through center portion 304 in comparison to side portions 306), the center portion 304 the DD 300 coil may only be single-stacked in order to provide sufficient space for the underlying ferrite material, while keeping the thickness of the pad small.

The bend radius associated with the litz wire may present a mechanical limitation for reducing an overall size of the vehicle pad, due to a minimum area for window areas 303a and 303b being required in order to accommodate the bend radius of the wires. For example, as illustrated in FIG. 3A, the output wires 308 from the first coil 302a form a bend 310 within window 303a. As such, the size of window 303a must be configured to be large enough to accommodate the bend 310, the size of which is constrained by the bend radius of the litz wire. In addition, a large bend radius of the litz wire may limit a number of loops that can be wound in a DD coil of a given size.

In some embodiments, the bend radius associated with a litz wire may be based upon a cross-sectional length of the litz wire in the direction parallel to the plane defined by the coil. In some embodiments, when a rectangular litz wire is used and positioned to reduce the thickness of the vehicle pad (e.g., positioned horizontally), the wire may have a larger bend radius (e.g., due to the greater length of the horizontal side of the wire).

Figure 4:
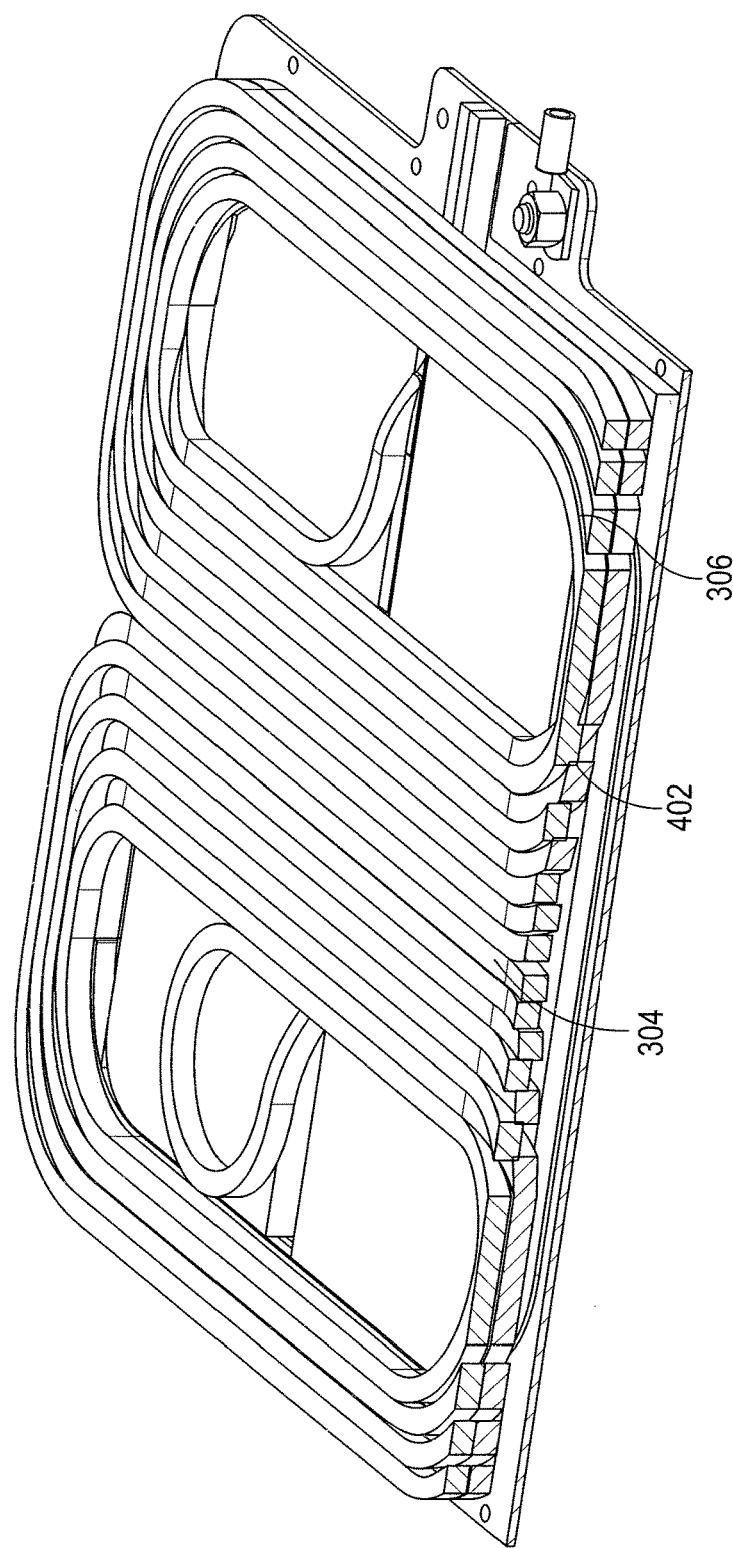
FIG. 4 illustrates a perspective cutout view of a double-stacked DD coil wound using rectangular litz wire.

In addition, in some embodiments, one or more clashes may occur where the litz wires transition between a single-stacked arrangement and a double-stacked arrangement. For example, FIG. 4 illustrates a perspective cutout view of a double-stacked DD coil wound using rectangular litz wire. As illustrated at 402, as the rectangular litz wire transitions between a single-stacked arrangement at center portion 304 to a double-stacked arrangement at side portions 306, one or more clashes between the corners of adjacent litz wires may occur, increasing the difficulty of winding the litz wire to form the DD coil.

DD Coil with Twisted Rectangular Litz Wire

As discussed above, the bend radius associated with a rectangular litz wire imposes mechanical constraints on a number of loops that can be wound in a DD coil, and on a size of the DD coil. In addition, the size of the DD coil may also be limited by the width of central portion 304 of the DD coil. The wider the central portion 304, the smaller the windows 303a and 303b will be for accommodating the bend radius of the litz wire. As such, in order to make use of rectangular litz wire, a vehicle pad may need to either increase in size or reduce a number of turns in the coil (e.g., thereby reducing the width of the central portion 304).

In some embodiments, the bend radius of a litz wire may be reduced by reducing the cross-sectional length of the litz wire along the bend. In addition, if the width of the center portion 304 of the DD coil were to be reduced, a larger window 303a or 303b for accommodating the bend radius of the litz wire can be achieved. As such, the vehicle pad can be made to be smaller in size or to accommodate more turns in the coil (thereby increasing an amount of current that can be generated).

Figure 5A:
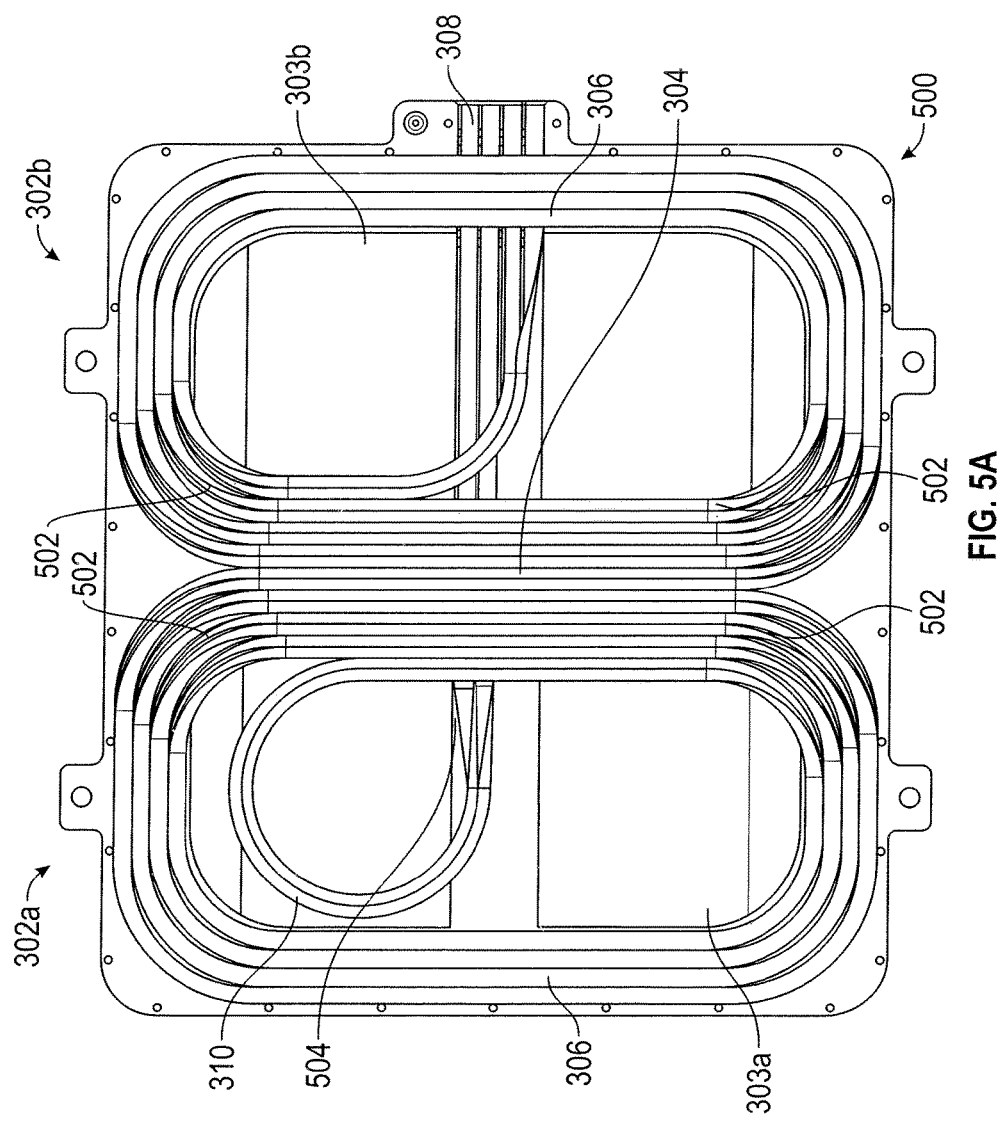
FIGS. 5A-5C illustrate a top-down, a perspective, and a perspective cutout view of a double-stacked DD coil using a twisted rectangular litz wire.
Figure 5B:
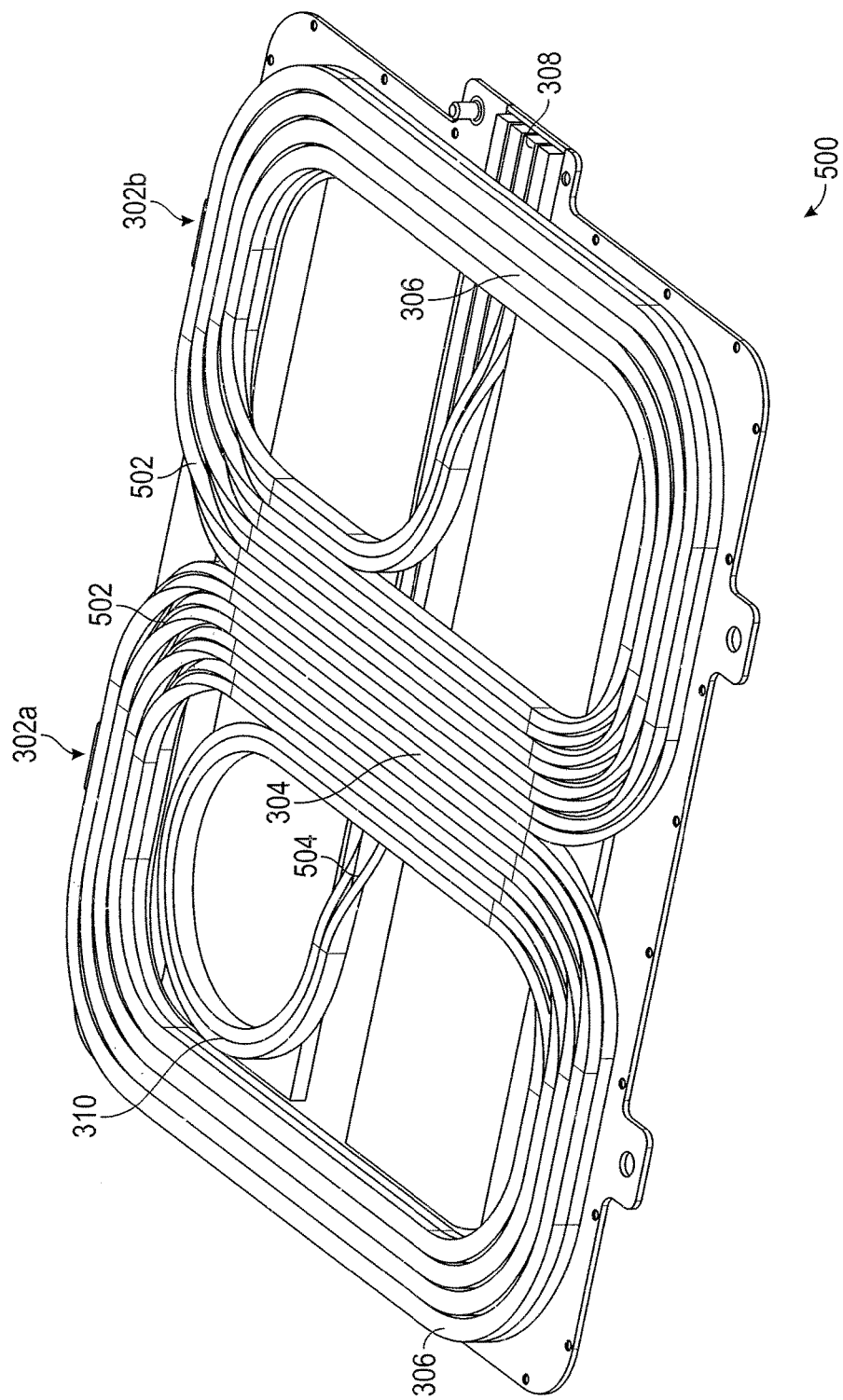
Figure 5C:
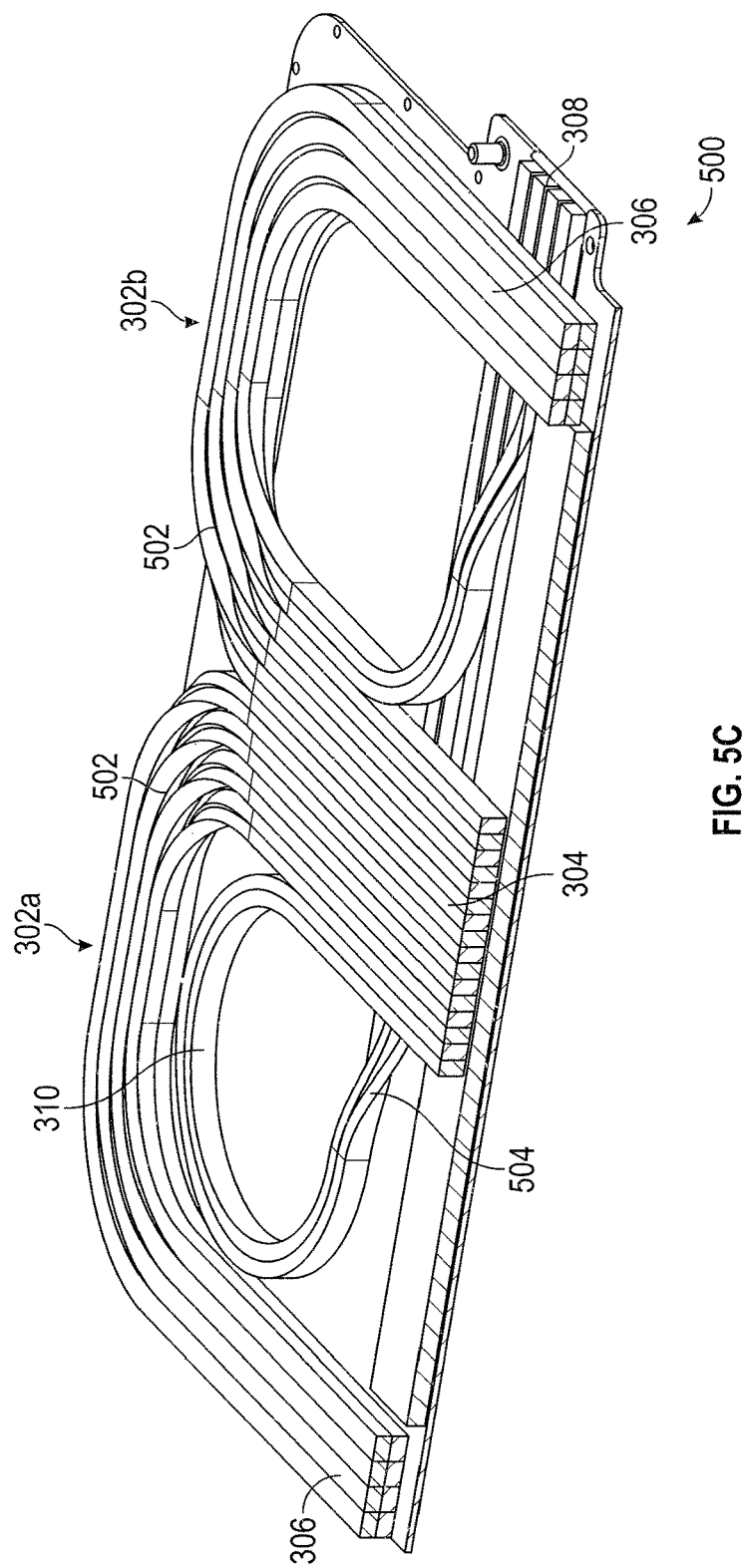

In some embodiments, the rectangular litz wire used to form the DD coil may be twisted between the central portion 304 and side portions 306. FIGS. 5A-5C illustrate a top-down, perspective, and perspective cutout views of a double-stacked DD coil 500 using a twisted rectangular litz wire. As illustrated in FIGS. 5A and 5B, the double-stacked DD coil 500 is similar in shape to the double-stacked DD coil illustrated in FIGS. 3A and 3B. However, unlike the double-stacked DD coil 300 of FIGS. 3A and 3B, the rectangular litz wire of the DD coil 500 is twisted 90 degrees between side portions 306 and central portion 304. For example, while the rectangular litz wire is oriented horizontally at side portions 306, the litz wire is oriented vertically at the central portion 304. As will be discussed below, twisting the litz wire between the central portion 304 and side portions 306 may serve to reduce the width of the single-stacked central portion 304 of the coil, while not increasing the thickness of the double-stacked side portions 306 of the coil.

Figure 6:
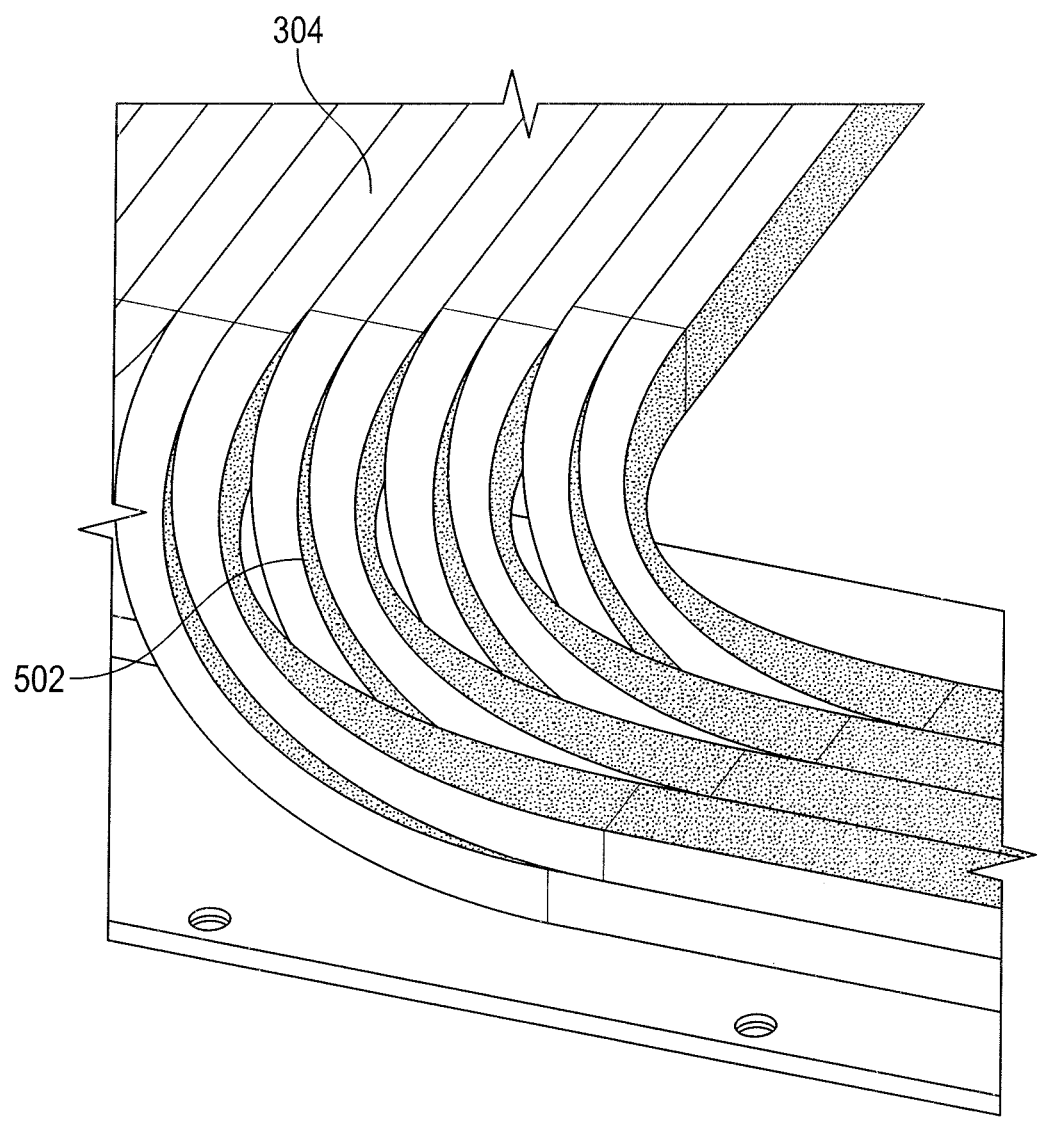
FIG. 6 illustrates a close-up perspective view of twisting implement in a DD coil.

FIG. 6 illustrates a close-up view of twisting implementing in a DD coil, in accordance with some embodiments. As illustrated in FIG. 6, the central portion 304 of the DD coil comprises single-stacked litz wires oriented vertically (such that the width of central portion 304 defined by the shorter edge of the litz wires). At area 502, as the litz wire transitions for single-stacked to double-stacked, the litz wires are twisted 90 degrees such that they are oriented horizontally when double-stacked (such that the thickness of DD coil is based on the shorter edge of the litz wires).

Because the litz wire is oriented vertically at the central portion 304 of the DD coil 500, the thickness of the DD coil 500 at the central portion 304 is based upon the longer edge of the litz wire, instead of the shorter edge of the litz wire as illustrated in FIGS. 3A and 3B. However, because the central portion 304 is single-stacked instead of double-stacked, the overall thickness of the DD coil 500 may remain the same (e.g., if the length of the longer edge of the litz wire is less than twice that of the shorter edge).

In addition, because the width of the central portion 304 is based upon the shorter edge of the litz wire, the width of the central portion 304 may be reduced (e.g., by an amount based upon the difference between the shorter edge and longer edge of the litz wire, times a number of turns in the coil). The reduced width of the central portion 304 creates a larger area (e.g., window area 303a) for accommodating the bend radius of the litz wire. This may allow for the size of the DD coil 500 to be decreased, or the number of turns in the coil to be increased, or some combination thereof.

In addition, twisting the litz wire between the central portion 304 and side portions 306 (at areas 502) may change the cross-sectional length of the litz wire from being based upon the longer edge of the litz wire to the shorter edge of the litz wire, thereby reducing the required bend radius of the litz wire. For example, because the litz wire is twisted to be vertically oriented at central portion 304, the litz wire at bend 310 of the DD coil 500 will also be vertically oriented. Because the required bend radius for bend 310 will be smaller due to the vertical orientation of the litz wire, the size of window area 303a required in order to accommodate the bend 310 is reduced. As such, the size of the DD coil 500 may be reduced, or a number of turns in the coil increased, or some combination thereof.

In some embodiments, the litz wire may be twisted again at 504 near the end of bend 310 to be oriented horizontally, in order to reduce the thickness of the litz wire as it passes under central portion 302 and/or a side portion 306.

Figure 7:
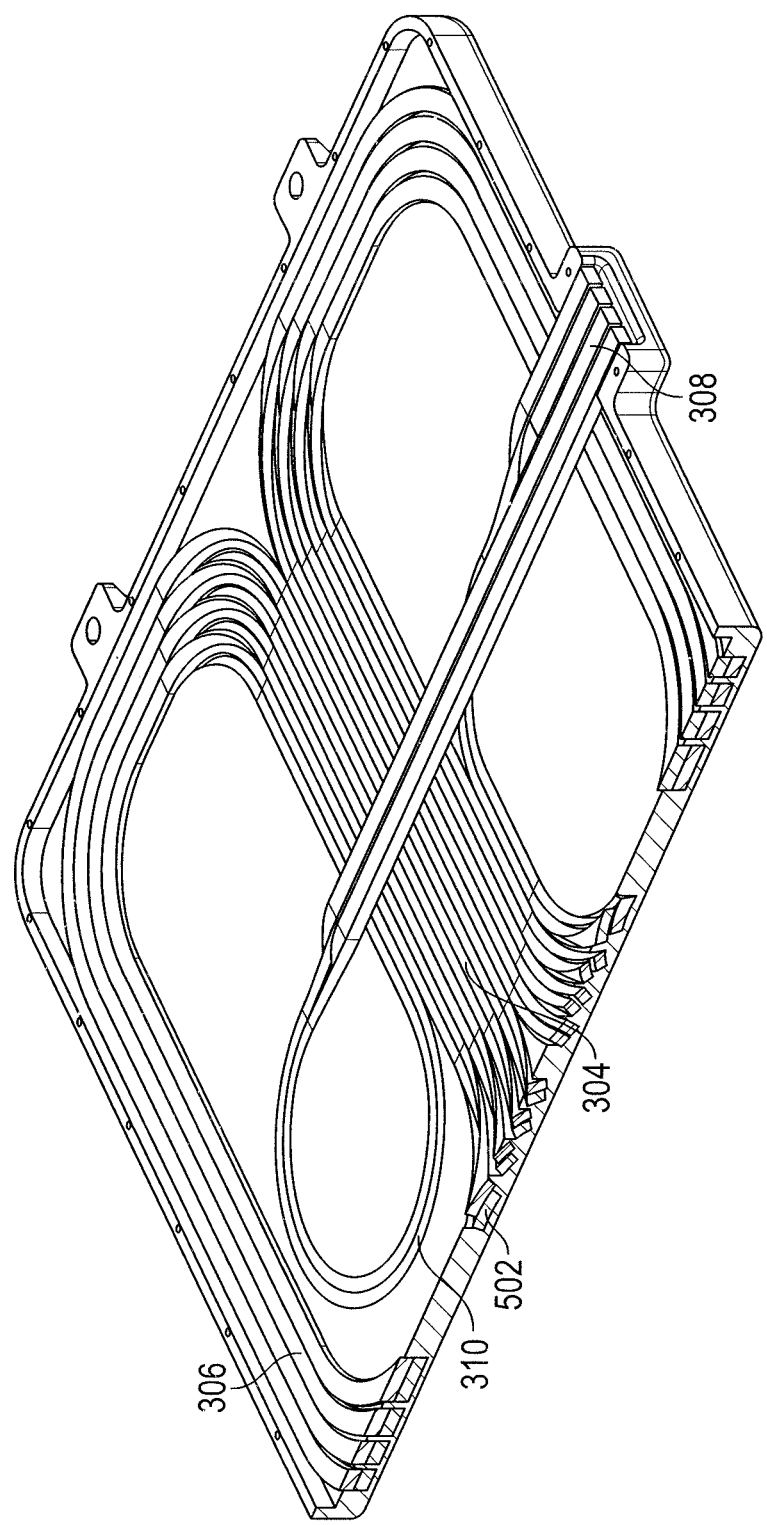
FIG. 7 illustrates a perspective cutout view of a DD coil using twisted rectangular litz wire.

In some embodiments, by twisting the litz wire as it transitions between a single-stacked arrangement and a double-stacked arrangement (e.g., at areas 502), a number of clashes between strands of the litz wire may be reduced. FIG. 7 illustrates a perspective cutout view of a DD coil using twisted rectangular litz wire. At area 502, where the litz wire transitions between a single-stacked arrangement at the center portion 304 to a double-stacked arrangement at side portions 306, the twisting of the litz wires by 90 degrees from a vertical orientation to a horizontal orientation helps to eliminate clashing between adjacent strands of litz wires. In some embodiments, one or more ribs or other structures may be used to guide the litz wire.

In some embodiments, twisting of rectangular litz wires may be used in non-DD coils. For example, any coil having a first portion stacked in n layers and a second portion stacked with greater than n layers may implement twisting between the first and second portions (e.g., to reduce a width of the first portion, to reduce a bend radius of one or more sections of the coil, and/or the like).

In some embodiments, twisting of rectangular litz wires may be used in coils that are not double-stacked or do not have different portions with different amounts of stacking. For example, in some embodiments, a coil may be twisted on one or more sides to reduce a width of the coil on that side (e.g., a coil having a top, bottom, left, and right sides may be twisted such that the litz wire is in a horizontal orientation along the top/bottom sides, but vertical orientation along the left/right sides, in order to reduce a width of the left/right sides).

Figure 8:
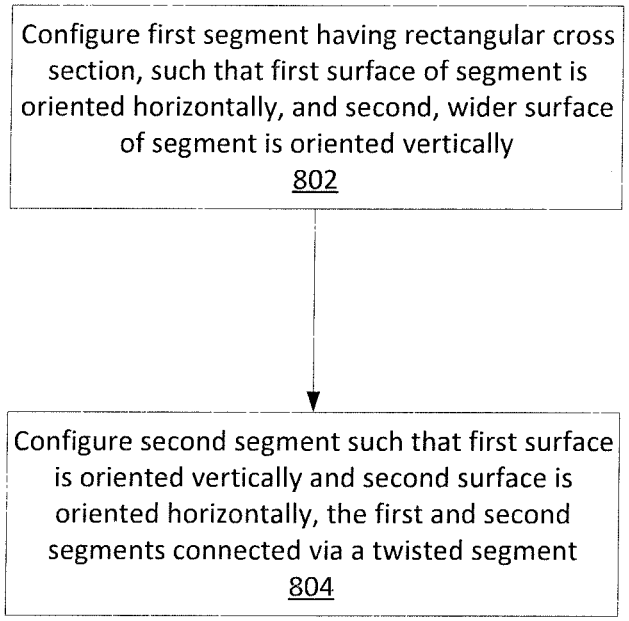
FIG. 8 illustrates of a flow chart of a process for winding litz wires to form a twisted DD coil for a vehicle or base pad.

FIG. 8 illustrates of a flow chart of a process for winding litz wires to form a first coil of a twisted DD coil for a vehicle or base pad. At block 802, a first segment of a winding of the coil is configured. The winding may have a rectangular cross section with a first surface having a first width and a second surface having a second width that is greater than the first width. The first segment may be configured such that the first surface is oriented horizontally relative to a housing structure, while the second surface is oriented vertically.

At block 804, a second segment of the winding may be configured. The second segment may be oriented such that the first surface is oriented vertically, while the second surface is oriented horizontally. The first and second segments may be connected via a twisted segment. The twisted segment connecting the first and second segments may be twisted 90 degrees.

In some embodiments, the first and second segments may comprise litz wire.

In some embodiments, the first coil may comprise a plurality of windings, the first segments of the windings arranged in a single-stacked arrangement in a first portion of the first coil, and the second segments arranged in a double-stacked arrangement in a second portion of the first coil. In some embodiments, the DD coil may further comprise a second coil comprising a plurality of second windings. Each of the second windings may have a rectangular cross-section with at least a first surface having a first width and a second surface orthogonal to the first surface having a second width greater than the first width, and comprise a first segment having the first surface oriented horizontally and the second surface in the first segment oriented vertically relative to a surface of a housing structure, and a second segment having the first surface in the second segment oriented vertically and the second surface in the second segment oriented horizontally relative to the surface of the housing structure, the second segment connected to the first segment via a twisted segment. The first coil may enclose a first area, and the second coil may be coplanar to the first coil and enclose the second area. The first and second coils may share a common central portion. In some embodiments, first segments of the first and second coils are configured to be parallel to each other in at least a portion of the common central portion of the DD coil.

In some embodiments, the common central portion of the DD coil may comprise one or more first segments of the first and second coils, while outer portions of DD coils may comprise one or more second segments. In some embodiments, the first coil may further comprise an output portion extending from the common central portion and forming a bend within the first area.

For purposes of summarizing the disclosure, certain aspects, advantages and novel features of the present disclosure have been described herein. It is to be understood that not necessarily all such advantages can be achieved in accordance with any particular embodiment of the present disclosure. Thus, the present disclosure can be embodied or carried out in a manner that achieves or optimizes one advantage or group of advantages as taught herein without necessarily achieving other advantages as can be taught or suggested herein.

Various modifications of the above described embodiments will be readily apparent, and the generic principles defined herein can be applied to other embodiments without departing from the spirit or scope of the present disclosure. Thus, the present disclosure is not intended to be limited to the embodiments shown herein but is to be accorded the widest scope consistent with the principles and novel features disclosed herein.

What is claimed is:

1. A device for generating or receiving wireless power via a magnetic field at a level sufficient to power or charge an electronic device, comprising:

a first coil configured to generate or receive wireless power via a magnetic field, the first coil comprising one or more first windings each having a substantially rectangular cross-section with at least a first surface having a first width and a second surface orthogonal to the first surface having a second width greater than the first width, each of the first windings comprising:
  a first segment having the first surface oriented horizontally and the second surface in the first segment oriented vertically relative to a surface of a housing structure; and
  a second segment having the first surface in the second segment oriented vertically and the second surface in the second segment oriented horizontally relative to the surface of the housing structure, the second segment connected to the first segment via a twisted segment;
  wherein the first segments of the first windings are arranged in a single-stacked arrangement in a first portion of the first coil, and the second segments of the first windings are arranged in a double-stacked arrangement in a second portion of the first coil.

2. The device of claim 1, further comprising a second coil configured to generate or receive wireless power via the magnetic field, the second coil comprising one or more second windings each having a substantially rectangular cross-section with at least a first surface having a first width and a second surface orthogonal to the first surface having a second width greater than the first width, each of the second windings comprising:
  a first segment having the first surface oriented horizontally and the second surface in the first segment oriented vertically relative to the surface of the housing structure; and
  a second segment having the first surface in the second segment oriented vertically and the second surface in the second segment oriented horizontally relative to the surface of the housing structure, the second segment connected to the first segment via a twisted segment.

3. The device of claim 2, wherein the device comprises a double D (DD) coil having the first coil enclosing a first area and the second coil coplanar to the first coil enclosing a second area, and wherein the first and second coils share a common central portion.

4. The device of claim 3, wherein the first segments of the first and second coils are configured to be parallel to each other in at least a portion of the common central portion of the DD coil.

5. The device of claim 1, wherein the first coil having an enclosed area, and wherein the first coil comprises an output portion extending from the first segment and forming a bend within the area enclosed by the first coil.

6. The device of claim 1 wherein the first coil comprises a litz wire.

7. The device of claim 1, wherein the twisted segment is twisted 90 degrees.

8. The device of claim 1, wherein the first and second segments of a first winding of the one or more first windings are substantially coplanar.

9. An apparatus for wirelessly transferring power, comprising:
  a first coil configured to wirelessly receive power via a magnetic field, the first coil comprising one or more litz wires each having a rectangular cross section with a first longer side and a second shorter side; and
  a second coil configured to wirelessly receive power via a magnetic field, the second coil comprising one or more of the litz wires and the positioned to be at least partially coplanar with the first loop;
  wherein each of the first and second loops comprises a plurality of litz wires, each having a rectangular cross section with a first longer side and a second shorter side, and
  wherein the one or more litz wires of the first and second coils are twisted such that a width of the first and second coils at a first location is defined by the first longer side of the one or more litz wires, and a width of the coils at a second location is defined by the second shorter side of the one or more litz wires.

10. The apparatus of claim 9, further comprising a housing structure configured to house the first and second coils;
  wherein the first location is located in a central portion of the housing and the second location is located at a portion of a perimeter of the housing structure.

11. The apparatus of claim 9, wherein the litz wires are twisted 90 degrees between an outer portion and an inner portion of the first and second loops.

12. The apparatus of claim 11, wherein the inner portions of the first and second loops are directly adjacent to each other.

13. The apparatus of claim 9, further comprising an output portion extending from a single-stacked inner portion and forming a bend within either the first location or second location.

14. A method of winding coils of a charging device for generating or receiving wireless power via a magnetic field at a level sufficient to power or charge an electronic device, comprising:
  positioning a first coil comprising one or more rectangular litz wires having a length greater than a width such that the length is parallel with a plane of the charging device in a first region of the charging device and perpendicular with the plane in a second region of the charging device;
  wherein the one or more rectangular litz wires are arranged in a double-stacked arrangement in the first region and a single-stacked arrangement in the second region.

15. The method of claim 14, further comprising:
  positioning a second coil comprising one or more of the rectangular litz wires such that the length is parallel with the plane in a third region of the charging device and perpendicular with the plane in the second region of the charging device.

16. The method of claim 15, wherein the first and third regions are located at a perimeter of the charging device and the second region is located in a central location of the charging device.

* * * * *